(12) United States Patent
Rinscheid (10) Patent No.: US 8,744,751 B2
(45) Date of Patent: Jun. 3, 2014

(54) NAVIGATION UPDATE SYSTEM FOR A VEHICLE

(75) Inventor: Ansgar Rinscheid, Glinde (DE)

(73) Assignee: Harman Becker Automotive Systems, GmbH, Karlsbad (DE)

( * ) Notice: Subject to any disclaimer, the term of this patent is extended or adjusted under 35 U.S.C. 154(b) by 210 days.

(21) Appl. No.: 12/856,346

(22) Filed: Aug. 13, 2010

(65) Prior Publication Data

US 2011/0040478 A1    Feb. 17, 2011

(30) Foreign Application Priority Data

Aug. 14, 2009    (EP) .................................. 09010527

(51) Int. Cl.
*G01C 21/00* (2006.01)
*G08B 1/08* (2006.01)
*G06F 7/00* (2006.01)
*G06F 7/04* (2006.01)

(52) U.S. Cl.
USPC .................... 701/409; 340/539.13; 340/5.8

(58) Field of Classification Search
USPC .............. 701/409, 522; 70/276, 278.3, 278.7, 70/416; 340/572.1, 425.5, 539.11, 539.13, 340/572.8, 5.1, 5.6, 5.65–5.67, 5.8, 5.81
See application file for complete search history.

(56) References Cited

U.S. PATENT DOCUMENTS

| | | | | |
|---|---|---|---|---|
| 4,686,358 A | * | 8/1987 | Seckinger et al. | ............. 235/382 |
| 4,712,398 A | * | 12/1987 | Clarkson et al. | ................ 70/276 |
| 7,082,483 B2 | | 7/2006 | Poo | ................ 710/68 |
| 7,212,889 B2 | | 5/2007 | Mann | ................ 701/1 |
| 7,657,226 B2 | * | 2/2010 | Gisler | .......................... 455/41.2 |
| 8,253,543 B2 | * | 8/2012 | Yamamoto | ................ 340/10.52 |
| 2002/0189307 A1 | * | 12/2002 | Gokcebay et al. | ........... 70/278.3 |
| 2004/0089039 A1 | * | 5/2004 | Russell et al. | ............... 70/278.3 |
| 2005/0144995 A1 | * | 7/2005 | Russell et al. | ............... 70/278.3 |
| 2006/0044109 A1 | * | 3/2006 | Griffits et al. | ................ 340/5.65 |
| 2006/0195402 A1 | * | 8/2006 | Malina et al. | ................... 705/50 |
| 2008/0034223 A1 | * | 2/2008 | Funahashi | ..................... 713/193 |
| 2008/0052770 A1 | * | 2/2008 | Ali et al. | ........................... 726/9 |
| 2008/0150679 A1 | * | 6/2008 | Bloomfield | .................... 340/5.7 |
| 2008/0172740 A1 | * | 7/2008 | Kondo | ............. 726/22 |
| 2009/0132739 A1 | | 5/2009 | Kang | ............... 710/68 |
| 2009/0243814 A1 | * | 10/2009 | Yamamoto | ................ 340/10.52 |
| 2010/0186076 A1 | * | 7/2010 | Ali et al. | ........................... 726/9 |
| 2011/0218980 A1 | * | 9/2011 | Assadi | ......................... 707/700 |

FOREIGN PATENT DOCUMENTS

| | | | |
|---|---|---|---|
| DE | 10142836 A1 | | 5/2003 |
| DE | 10317499 A1 | | 4/2004 |
| DE | 10354515 A1 | | 7/2005 |
| DE | 102005030081 | * | 1/2007 |
| DE | 102005030081 A1 | | 4/2007 |
| FR | 2 882 713 A1 | | 3/2005 |
| FR | 2882713 | * | 9/2006 |
| JP | 2004108016 A | | 4/2004 |

OTHER PUBLICATIONS

European Search Report dated Jan. 19, 2010, in corresponding European Patent Application No. 09010527.1, filed Aug. 14, 2009.
Summons to Attend Oral Proceedings, mailed Jun. 28, 2012, in corresponding European Patent Application No. 09010527.1-1236, filed Aug. 14, 2009.
European Examination Report dated Dec. 2, 2011, in corresponding European Patent Application No. 09010527.1, filed Aug. 14, 2009.

* cited by examiner

*Primary Examiner* — Patrick Cicchino
(74) *Attorney, Agent, or Firm* — Patterson & Sheridan, LLP (57) ABSTRACT

A navigation update system includes a key of a vehicle. The key includes a memory storage device storing data for a navigation device of the vehicle. The data includes instructions for execution by the navigation device and/or map data for use by the navigation device to provide navigation services to a user of the vehicle.

26 Claims, 8 Drawing Sheets

NAVIGATION UPDATE SYSTEM FOR A VEHICLE

BACKGROUND OF THE INVENTION

1. Priority Claim

This application claims priority under 35 U.S.C. §119 to the European patent application number 09010527.1, filed Aug. 15, 2009, entitled "Key of a Vehicle and a Navigation Device."

2. Technical Field

The invention is directed to a navigation update system that may include a key of a vehicle and a navigation device for providing a navigation service.

3. Related Art

In order to select a route for a vehicle to guide it to a desired destination, vehicles quite often are equipped with navigation devices. Such a navigation device comprises software, and has access to map data. The software enables the navigation device to evaluate the map data to find an appropriate route from a starting point to the destination. However, the availability of roads may change with time. For example, new roads may be put into operation, existing roads may be closed for vehicles, or may be changed to one-way roads. Hence, to permit proper operation of a navigation device, up-to-date map data may be provided to the navigation device from time to time. Processing of amended map data may also require updates, from time to time, of the software instructions executed by the navigation device.

New map data and/or new software instructions may be provided to the user on computer-readable media; often, CD-ROMs are used for this purpose. Then, it is left to the user to insert the computer-readable media into the navigation device and start updating it by transferring the new map data and/or new software instructions to the navigation device. However, the user has to handle the CD very carefully to protect it from dirt and scratches which would render it useless. Moreover, the user has to refer to the instruction manual of the navigation system to learn how to operate the navigation device such that an update of data or software instructions can be performed. This makes updating the navigation system an awkward task for the user.

In view of this, there is a need for a system providing an easier way for the user to update data and/or software instructions of a navigation system in a vehicle.

SUMMARY

A navigation update system may include a key of a vehicle. The key includes a memory storage device storing data, such as data for a navigation device of the vehicle. In one example, the data stored on the memory storage device includes instructions for execution by the navigation device and map data. The system may also include a navigation device of a vehicle configured to provide a navigation service using data stored in the memory storage device of the key.

Information included in the data stored in the memory storage device may be encrypted or compressed. The key may include a processor to perform some amount of encryption and/or compression of the data. Alternatively, or in addition, the navigation system may perform encryption and/or compression.

The key may include an interface for communication with an interface of the navigation device. The navigation device may be part of the navigation update system, or may be external to the navigation update system. Accordingly, the navigation device is an optional part of the navigation update system. Communication may be wireline communication, wireless communication, or a combination of wireless and wireline communication between the interfaces. Verification and authentication of the key may be performed by the navigation device, or by a verification device included in the navigation update system. The verification device may also operate to relay data from the key to the navigation device. The verification may be part of the navigation update system, or may be external to the navigation update system. Accordingly, the verification device is an optional part of the navigation update system.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The navigation update system includes a key of a vehicle. The key includes a memory, such as a memory storage device storing data for a navigation device of the vehicle. The data includes instructions for execution by the navigation device and/or map data to be used by the navigation device.

It should be understood that the term "navigation device" is used in this description synonymously with the term "navigation system." The navigation device or system may be part of the navigation update system. Alternatively, the navigation device may be external to the navigation update system. In the case where the navigation device is external to the navigation update system, functionality included in the navigation device may enable the key and the navigation device to establish a communication path to perform the functionality described. Also, operational functionality of the navigation device with respect to the navigation update system may be provided to the navigation device from the key whether the navigation device is included within the navigation update system, or external to the navigation update system.

This key stores, in its memory, instructions (i.e. software code) that are to be executed by the navigation device, and/or map data to be used by the navigation device. Therefore, such a key can serve as a way of supplying, to a user of a vehicle with a navigation device, up-to-date data, i.e. software code and/or map data. To obtain new data, the user may be provided with a new key of the user's vehicle. As the user may use the key to start the vehicle, there is the opportunity for the navigation system to access and/or copy the data stored in the memory of the key without the need for the user to make any explicit efforts to update the navigation system. The navigation system may use information obtained from the key data to provide navigation services, such as point-to-point navigation instructions from a first location to a destination, a route of multiple destinations, or any other routing directions. In addition, navigation services may include points of interest, identification of user specified locations, such as businesses providing goods or services in which a user is interested, alternative routes, obstacle avoidance, such as traffic avoidance information, and estimated time of arrival at a destination information.

The vehicle may be a road vehicle, such as a car, a bus, a lorry or a van. In other examples, the vehicle may be a plane, a boat, a motorcycle, or any other powered conveyance or transport of one or more users of the vehicle. The key may be a substantially uniquely matched security device for the vehicle. In one example, the key of the vehicle may be a car key. Usage of the key may be required to put the vehicle into operation, operate features included on the vehicle, and/or access areas of the vehicle such as a passenger compartment, a storage compartment, an engine compartment, or any other secured area of the vehicle.

At least a part of the data stored in the key may be encrypted, and/or compressed. In addition, or alternatively, accessing the data stored in the key may require providing a password. The password may be a user supplied password, a password provided in an automated fashion by a vehicle, and/or some combination of manual and automated provision of a password. In this way, the key may be able to store map data of a large area even in a limited amount of memory. By encrypting the data, it is ensured that the content of the memory cannot be read and used by any unauthorized person or unauthorized vehicle. Instead, a user of the data may have to provide a proper cryptographic key to decrypt the stored data. By decrypting, the data may be rendered into a format suitable for use by the navigation device to provide the navigation service. Encrypting and decrypting the data may be accomplished by use of a symmetric key cryptographic method, by use of a cryptographic method involving cryptographic public and private keys, or any other method or mechanism for securing the data such that only authorized access is permitted.

The key may include access means configured to perform at least one of encrypting, decrypting, compressing, decompressing data, and generating and/or verifying a password. Such access means may include a central processing unit (CPU), a processor, or a microprocessor capable of executing instructions stored in memory. By including access means into the key, it may be possible to store the data in the memory of the key in an encrypted and/or compressed format. At the same time, the data may be obtained from the key in a format which can be used for providing navigation services without the need that the receiver of the data carried out any decompression and/or decryption. This may be of advantage in a case where the receiver, for example, the navigation device, has limited processing capacity. The data to be stored in the memory of the key may be encrypted and/or compressed by the access means. The data may be obtained from the internet, a computer such as a personal computer or a server, or any other source of data, and then may be stored in the memory of the key, and the access means, such as a processor, may perform compression and/or encryption of the data.

The key may further include an interface to provide access to the data stored in the memory of the key. The interface of the key may also be used to attach the key to an interface of the navigation device. The interface of the key may enable a wired or wireless data connection to the navigation device via the interface of the navigation device interface. The interface of the key may comply with the USB standard, firewire, TCP/IP, and/or any other wireless, or wireline communication standards or protocols.

To provide for easier handling of the key, the interface of the key may be a wireless interface configured to connect to a wireless interface in the vehicle. The wireless interface in the vehicle may be the interface of the navigation device. The wireless interface of the key may communicate over a wireless data connection with the interface in the vehicle via electromagnetic waves, or via an optical connection, in particular, via a connection using infrared light. In one example configuration, communication over a wireless data connection may comply with the Bluetooth standard.

The key may include at least one verification feature that allows verifying the key by a verification device. Verification features may be any form or unique identifier of the key, such as a password. In one example, a cryptographic key or a password may be used. Verifying a cryptographic key or a password may include comparison of the cryptographic key or password to a reference value. Verifying a cryptographic key may include checking whether the cryptographic key (e.g., a cryptographic public key) corresponds to another cryptographic key (e.g., a cryptographic private key). The cryptographic key or password to be verified may be stored in the memory of the key.

The memory of the key may be any form of memory storage device, such as semiconductor memory, for example, volatile memory, flash memory, a flash drive, or the memory of a memory stick. In one example, the memory may be a random access memory (RAM), a read only memory (ROM), or any other data storage form. Data, such as instructions and map data for a navigation system, as well as instructions executable by the processor included in the key may be included in the memory of the key.

Putting the vehicle into operation may be dependent on providing an appropriate cryptographic key or password. Provision of the cryptographic key or password may rely on the key being within a predetermined proximity of the vehicle, such as within about 2 meters, being positioned within the vehicle, or being in physical contact with some part of the vehicle. For example, putting the vehicle into operation may be dependent on being able to put a bit of the key into a lock and being able to turn the key in the lock. The bit may be a rigid material formed in a unique pattern that corresponds to a bit receiver mounted in the vehicle. In some examples, the bit may be a blade, such as a blade made of steel or other rigid material that is cut to a predetermined unique pattern. In other examples, the bit may be a collar, a plate, a barrel, a receptacle, a rod, a stud an ear or any other form of substantially flat, protruding, or recessed member capable of being formed with unique features that may be matched to a bit receiver. In another example, putting the vehicle into operation may be dependent on wireless communication being established between the key and the vehicle.

The verification feature(s) of the key may include the shape of the key, in particular, the form of a bit of the key, and/or electronic verification data stored in the memory of the key. The electronic verification data may be stored in the memory of the key. Electronic verification data may be compressed and/or encrypted. The verification device and/or the navigation device may be able to decompress/decrypt electronic verification data. The access means of the key may compress/decompress and/or encrypt/decrypt electronic verification data. The key may be verified by being able to turn it when putting the bit of the key into a lock. The key may also be an electronic key, comprising electronic verification data. Electronic verification data may be derived from other data stored in the memory of the key.

The electronic verification data may include a password, such as a cryptographic element and/or a password. A cryptographic element may be a cryptographic symmetric key, a cryptographic public key, a cryptographic private key, or a hash value. The hash value may be computed based on the instructions and/or the map data stored in the memory of the key. The hash value may be encrypted using a cryptographic key, in particular, a cryptographic public key or a cryptographic private key.

The memory of the key may store information relating to a configuration of the navigation device. Such information may include a preferred area where the car may be put into operation, and/or a preferred area where the car will be preferably located. Information relating to the configuration of the navigation device may include route preferences, settings for language, settings for the user interface of the navigation device, destinations, address lists, user preferred business and services, or any other information related to the functionality present in navigation device.

The memory of the key may store information relating to a configuration of an external device in the vehicle. External devices present in the vehicle may include: a device for controlling seat position, a device for controlling mirror orientation, a radio, a device for internal or external network access, a multimedia device, or any other device or service available to a user of the vehicle.

The navigation device may be configured to provide a navigation service using data stored in the memory of a key of a vehicle, wherein the data may include instructions for execution by the navigation device and/or map data for use by the navigation device. The navigation device may include a memory. The memory of the navigation device may be semiconductor memory, for example, volatile memory, flash memory, a flash drive, or the memory of a memory stick. The memory of the navigation device may also include a mass storage medium, for example, a hard disk or an optical storage medium such as a CD-ROM or a DVD. The memory of the navigation device may store at least a part of the instructions to be executed and/or of the map data to be used by the navigation device to provide navigation related services. The navigation device may access data obtained from the key to provide the navigation services. The data may be accessed, in particular, via the interface of the key.

The navigation device may access data obtained from the key to provide navigation services. The data may be obtained by directly accessing the memory of the key and copying the data from the memory. The process of copying may include decrypting and/or decompressing the data. The obtained data may be decompressed and/or decrypted by the processor included in the key. The navigation device may be able to decompress/decrypt electronic verification data stored in the memory of the key. Alternatively, or in addition, the navigation device may access the memory of the key and use the data stored in the key without copying the data from the memory of the key.

The navigation device may copy data obtained from the key to the memory of the navigation device. The data may be obtained from the memory of the key. The obtained data may be stored in the memory of the navigation device.

The navigation device may decrypt and/or decompress data obtained from the key. The navigation device may store a part or all of the obtained data from the key to the memory of the navigation device, and then decrypt and/or decompress the copied data. The navigation device may also obtain data from the memory of the key and decrypt and/or decompress the data before storing the data in the memory. The navigation device may also first decompress or decrypt data obtained from the key, then store the resulting data in a memory of the navigation device, and then decrypt or decompress additional data obtained from the stored data in the key.

The navigation device may execute instructions stored in the memory of the key, and/or access map data stored in the memory of the key to provide navigation services. To optimize resources of the navigation device, such as the available processing power of the navigation device, the navigation device need not provide memory for storing instructions and/or map data for providing the navigation service. The navigation device may access the memory of the key via the interface of the key. The processor included in the key may perform decompressing and/or decrypting of the data stored in the memory of the key prior to forwarding the decompressed and/or decrypted data to the interface of the key. The data stored in the memory storage device of the key may include a first set of data and a second set of data. The processor may permit the navigation device to obtain, from the interface of the key, the first set of data which is not compressed and/or not encrypted, while at least a part of the second set of data stored in the memory of the key may be compressed and/or encrypted.

The memory of the navigation device may store at least a part of the instructions to be executed and/or part of the map data to be used. The instructions to be executed and/or the map data to be used may be stored in the memory of the navigation device prior to being used for providing navigation services. The navigation device may check if the instructions and/or map data stored in the memory of the navigation device correspond to the instructions and/or map data provided by the key. If the instructions and/or map data stored in the memory of the navigation device correspond to the instructions and/or map data provided by the key, then the navigation device may use the instructions and/or map data stored in the memory of the navigation device for providing navigation services.

The memory of the navigation device may keep its data content if the navigation device is without power. The memory of the navigation device may be, for example, a flash memory. If more recent instructions and/or map data than the instructions and/or map data stored in the memory of the navigation device are provided by the key, the navigation device may store the more recent instructions and/or map data in its memory. Accordingly, the navigation device may check the information stored in the key to confirm that more recent information is not already stored in the navigation device, and avoid obtaining data from the key in the event the navigation device already has more current information or instructions stored in memory.

The navigation device may perform at least one of decrypting, encrypting, compressing, decompressing data stored in the memory of the navigation device. For example, the navigation device may decompress and/or decrypt instructions and/or map data and/or verification features and/or version descriptors.

Data stored in the memory of the navigation device may be associated with a device version descriptor, and data stored in the memory of the key may be associated with a key version descriptor. A version descriptor may be a data item which indicates the version of data it is associated with. The key version descriptor may be stored in the memory of the key. The device version descriptor may be stored in the memory of the navigation device. The navigation device may provide navigation services based on the data stored in the memory of the key if the key version descriptor corresponds to a more recent version than the device version descriptor. The navigation device may update part or all of the data stored in the memory of the navigation device when the key version descriptor corresponds to a more recent version than the device version descriptor. Updating data may include replacing at least a part of the instructions and/or map data stored in the memory of the navigation device by instructions and/or map data obtained from the key. The navigation device may replace instructions/map data stored in the navigation device by instructions/map data obtained from the key if the version descriptor associated with the instructions/map data in the key is more recent than the version descriptor associated with the instructions/map data stored in the navigation device. The version descriptors may be compressed and/or encrypted.

There may be a first key version descriptor associated with instructions stored in the memory of the key, and a first device version descriptor associated with instructions stored in the memory of the navigation device. Alternatively or in addition, there may be a second key version descriptor associated with the map data stored in the memory of the key, and a second device version descriptor associated with map data stored in the memory of the navigation device. The navigation device may update a part or all of the instructions based on the first key version descriptor and the first device version descriptor associated with instructions. Alternatively or in addition, the navigation device may update a part or all of the map data based on the second key version descriptor and the second device version descriptor associated with the map data.

Updating of instructions and/or map data may be carried out automatically, with or without consent of the user. Updating of instructions and/or map data may be carried out when a key version descriptor associated with instructions and/or map data, which corresponds to a more recent version than a device version descriptor associated with instructions and/or map data, is detected. Updating of instructions and/or map data may occur almost immediately, or may be delayed. For example, updating may be delayed during times of heavy computing by the navigation system, such as when calculating a to route to a destination, or until the navigation system is completely powered up and fully operational.

The navigation device may use instructions and map data to provide the navigation services, and the navigation services may be provided only if a first version descriptor associated with the instructions to be used corresponds to a second version descriptor associated with the map data to be used. The version descriptors may be a data items indicating the version of data the version descriptors are associated with. For example, a version descriptor may indicate the version of instructions associated with the version descriptor and the version of map data associated with the version descriptor. In this way, it may be ensured that the instructions used to provide the navigation service are applied to corresponding map data for which they are designed.

The navigation device may store instructions and/or map data together with their respective version descriptor/s in its memory. The navigation device may check if a version descriptor associated with the instructions stored in the navigation device corresponds to a version descriptor associated with map data provided by the key. The navigation device may check if a version descriptor associated with map data stored in the navigation device corresponds to a version descriptor associated with instructions stored in the key. The navigation device may replace instructions/map data stored in the navigation device by such instructions/map data obtained from the key, whose associated version descriptor corresponds to a more recent version than the version descriptor of the map data/instructions stored in the navigation device so long as the version descriptors of the map data and instructions also correspond.

The navigation update system may further include a verification device to verify the key via at least one verification feature. For example, the verification feature may be at least one verification feature included in the key. The verification device may include a mechanical lock verifying the key by checking a bit of the key. Alternatively, or in addition, the verification device may check verification data stored in the memory of the key. The verification device may be an electronic device having a processor and memory containing instructions executable by the processor to perform the verification. Alternatively or in addition, the verification device may be an electro mechanical device performing verification based on physical attributes of the key, such as a pattern of the bit. Verification data to be checked may be read from the memory of the key. The verification device may decide if the key entitles its user to put the vehicle and/or the navigation device into operation, based on at least one verification feature. In addition or alternatively, the verification device may determine if data stored in the memory storage device of the key is to be made accessible to the navigation device based on at least one verification feature.

In one example of the navigation update system, the verification device may provide a data connection for communication of data between the interface of the key and the navigation device. The verification device may access data stored in the memory of the key via the interface of the key. The verification device may access the interface of the key via a wired or wireless connection. The connection may be wired, for example, by a bus, or may be wireless to increase the flexibility of arranging the verification device and the navigation device. The verification device may provide the data connection for communication of data between the interface of the key and the navigation device only if the key has been verified successfully.

The verification device may signal to the navigation device that a connection to the interface of the key has been established. The navigation device may then obtain data from the key via the connection provided by the verification device. Alternatively, or in addition, the verification device may signal the key that a connection to the navigation system has been established. The key may then push data to the navigation device via the connection provided by the verification device.

The interface of the key may be attached to an interface of the verification device. For example, the interface of the verification device may be an interface where the key has to be attached to put the vehicle into operation. Alternatively, the interface of the key may be attached to an interface of the verification device via wireless communications.

In this regard, the key may include a second interface that may be used to attach the key to the interface of the verification device. The second interface may be an electronic interface or a mechanical interface or a combination of a mechanical and an electronic interface. The electronic interface may permit wired or wireless access to the verification device interface. Alternatively or in addition, the interface of the verification device may be a mechanical interface permitting verification of the key by mechanical means. For example, the interface of the verification device may be a lock, verifying the key by its bit. The second interface may be the bit of the key.

The verification device may ensure that the user of the key is entitled to put the vehicle into operation. Alternatively or in addition, the verification device may ensure that the user of the key is entitled to use the navigation system. Also, the verification device may ensure that data exchange between the key and the navigation device is allowed. For example, the verification device may be a lock in the vehicle, verifying that a bit of a key can be inserted into the lock. In addition, or alternatively, the verification device may be an electronic device configured to verify a cryptographic key or a password.

The data connection between the key and the navigation device via the interface of the key may be enabled when the interface of the key is attached to the interface of the verification device, and/or when the second interface is attached to the interface of the verification device. Enabling the data connection may require that the vehicle is put into operation. Attaching the interface of the key or the second interface of the key to the interface of the verification device may put the vehicle into operation. The second interface of the key may comply with the USB protocol standard or any other of one or more communication protocols. The verification device may be able to decompress/decrypt electronic verification data.

In the navigation update system, the key may have a bit, and the verification device may be the lock of the vehicle. The lock of the vehicle may be the device which has to be operated to put the vehicle into operation.

The verification device may forward data obtained from the key to the navigation device. The verification device may obtain data from the key to be forwarded, in particular, via the interface of the key. The verification device may include an interface where the interface of the key may be attached for accessing the key. The verification device may read data from the memory of the key. The verification device may obtain data from the key which has been decompressed and/or decrypted by processor included in the key. Alternatively, or in addition, the verification device may perform decompression and/or decryption of the obtained data. The verification device may forward the resulting data to the navigation device. In another alternative, the verification device may forward data that is remains compressed and/or encrypted to the navigation device for decompression and/or decryption.

The verification device may trigger the navigation device to accept data with a communication message. The verification device may send data to the navigation device in blocks of data, a stream of data, or any other data transfer mechanism or protocol. After sending an amount of data, the verification device may wait for a confirmation by the navigation device prior to sending more data. The navigation device may generate a signal for communication to the verification device indicating whether it is ready to receive data, or whether it is not ready to receive data. The verification device may, for example, forward instructions for providing navigation services, map data, information relating to a configuration of the navigation device, user specific data, and version descriptors associated with instructions for providing the navigation service and/or associated with map data. The data may indicate that the data should be provided together or separately.

If data is stored in the key which relates to the configuration of an external device in the vehicle, the verification device may forward data relating to the configuration of the external device directly to the external device. For example, the external device may be identified in the forwarded data as the recipient of the data. Alternatively, the data relating to the configuration of the external device may be forwarded by the verification device to another device such as the navigation device, which then forwards the data to the identified recipient. A list of external devices in the vehicle for which configuration information may be forwarded may include a device for controlling seat position, a device for controlling mirror orientation, a radio, a device for internal or external network access, such as a modem, and a multimedia device. Internal network access may provide access to information and processes occurring within or related to the vehicle over a vehicle bus, whereas external network access may provide wireless access to the Internet, or some other system or service such as cellular telephone service, data services, satellite radio, traffic services, or emergency services.

The navigation device may decrypt and/or to decompress data forwarded by the verification device, and/or the verification device may decrypt and/or to decompress data prior to forwarding. Decryption and/or decompression may be performed, by the verification device, while data is stored temporarily in a memory storage device included in the verification device, or may be performed during forwarding of the data by the verification device without storage in the verification device. Alternatively or in addition, the navigation device may decrypt and/or decompress forwarded data prior to storage, or may store forwarded data in its memory prior to decryption and/or decompression.

The navigation device may store data forwarded by the verification device in the memory of the navigation device. The memory of the navigation device may store at least a part of the instructions to be executed and/or of the map data to be used. If the navigation device does not have a memory or has limited memory storage capability, then no data or only some data may be stored in the navigation device and/or no data or only some data may be forwarded to the navigation device by the verification device. Alternatively, or in addition, data may be stored in the verification device and made available to the navigation device on an as-needed basis.

Operation of the navigation update system may involve establishing a wired or wireless data connection or communication path between the key and the navigation device. Establishing the wired data connection may include sending signals through the conductive bit of the key, or through any other physical communication path. Establishing the wired data connection may include connecting an interface of the key to an interface of the navigation device. The interface of the key may provide access to the memory of the key. The interface of the navigation device may include the lock of the vehicle. Establishing the wireless connection may include moving the key into an area near the vehicle. Alternatively or in addition, establishing a wireless connection may include unlocking of at least one door of the vehicle, and/or putting the vehicle into operation.

Operation of the navigation update system may also include establishing a wired or wireless data connection, or communication link, between the key and a verification device for verifying the key, and forwarding data to the navigation device from the verification device. Forwarding data may include decrypting and/or decompressing the data. The verification device may check whether the user of the key is entitled to put the vehicle into operation and/or whether data may be forwarded, based on verification features of the key. Verification features of the key may include a password such as the bit of the key, or cryptographic data stored in the memory of the key. Cryptographic data may include a cryptographic symmetric key, a cryptographic public key, a cryptographic private key, or a hash value.

The navigation update system further provides a computer program product stored on one or more computer data storage devices such as a hard drive, an optical storage device (such as a compact disc (CD)), a flash memory, or any other form of device capable of storing data. The computer program product may include one or more stored computer-readable instructions for performing the functionality described when the computer-readable instructions are executed on a computer.

Figure 1:
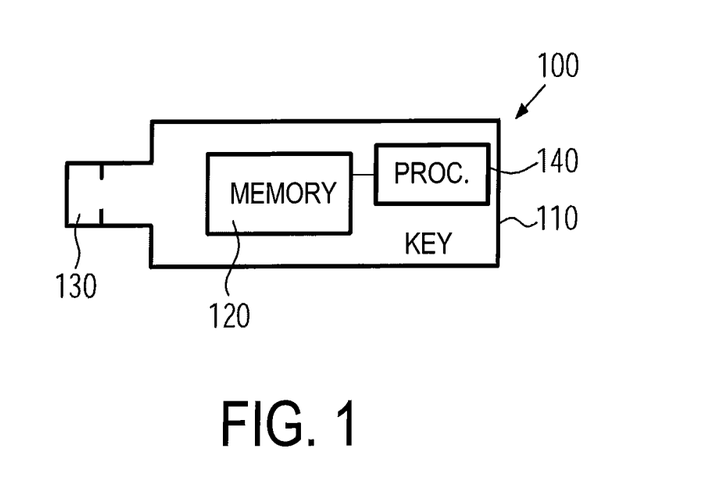
FIG. 1 illustrates an example of an electronic key.

FIG. 1 illustrates an electronic key 100 as an example of a key of a vehicle included in the navigation update system for the vehicle. The body 110 of the electronic key 100 includes a memory 120. The memory 120 is a memory storage device included in the electronic key 100. The memory 120 may include data in the form of instructions executable by a processor. The electronic key 100 may be equipped with a plug or other connective mechanism providing hardware for an interface 130 of the electronic key 100. The interface 130 may be connected to a corresponding interface of a vehicle that includes a navigation device powered by the vehicle. The interface of the vehicle may be an electronic lock of the vehicle where the key may be attached in order to put the vehicle in operation. In the memory 120 of the electronic key 100, data allowing verification of the key may be stored. The electronic key 100 may further include a processor 140 to compress, decompress, encrypt or decrypt data stored in the memory 120 of the electronic key 100. In addition, the processor 140 may execute instructions to establish communications, perform verification/authorization, manage data storage and retrieval, and perform any other functionality of the key 100. Instructions executed by the processor 240 may be stored in the memory 120.

In other examples, the interface 130 of the electronic key 100 may be provided in the absence of hardware. In these examples, attachment of the electronic key 100 is unnecessary. Instead, a predetermined distance between the electronic key 100 and the vehicle, or some part of the vehicle may enable communication and represent attachment of the interface 130 of the electronic key 100.

Figure 2:
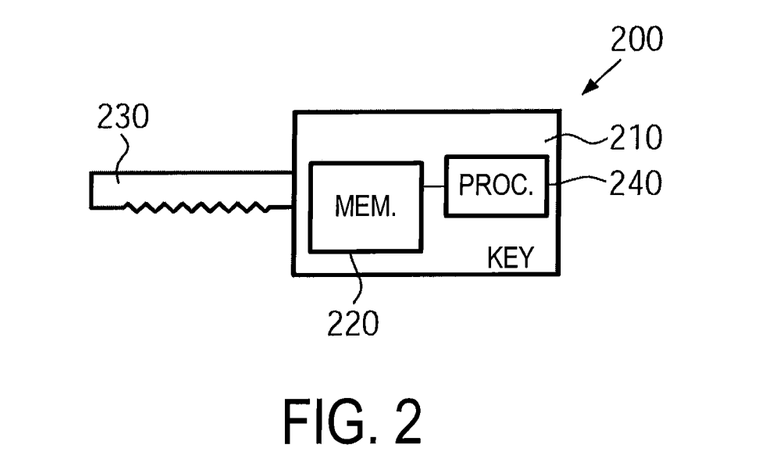
FIG. 2 illustrates an example of a mechanical key with a bit.

FIG. 2 illustrates a mechanical key 200 as another example of a key of a vehicle included in the navigation update system for the vehicle. The vehicle may include a navigation device powered by the vehicle. The mechanical key 200 may include a bit 230 having electrically conducting material, and a handle 210. The bit 230 is shaped in a predetermined way to substantially uniquely identify the mechanical key 200. For example, the bit 230 of the mechanical key 200 may be shaped such that the mechanical key 200 can be inserted into a corresponding lock and permits actuating the lock to an unlocked position, such as turning the lock of a vehicle such as a door lock or steering column lock. Inserting the key into the lock and/or actuating the lock may be required to put the vehicle into operation. The lock may be used as a verifying device, as only a key with a predetermined pattern of the bit can be inserted into the lock and, for example, enable actuating the lock. The mechanical key 200 has a memory 220 which may be embedded inside its handle 210. The memory 220 included in the mechanical key 200 can be accessed electrically such as via a communication path. The communication path may include the bit 230 of the mechanical key 200, which may be electrically conducting. In this way, the bit 230 of the mechanical key 200 may serve as an interface to the memory 220 of the key. The mechanical key 200 may further include a processor 240 which may compress, decompress, encrypt or decrypt data stored in the memory 220 of the mechanical key 200. In addition, the processor 240 may execute instructions to establish communications, perform verification/authorization, manage data storage and retrieval, and perform any other functionality of the mechanical key 200. Instructions executed by the processor 240 may be stored in the memory 220.

The processor (140, 240) of the electronic key 100 as well as the mechanical key 200 may ensure that access to the memory in the key may be accomplished only if a password has been provided to the respective processor. Provision of the password may occur via the interface (130, 230) of the key. The processor (140, 240) may also execute instructions to perform decryption of data stored in the memory (120, 220) of the key (100, 200). Alternatively or in addition, the processor (140, 240) may execute instructions to perform decompression of data stored in the memory (120, 220) of the key (100, 200). The processor (140, 240) may also execute instructions to compress data and/or may encrypt data which is to be stored in the memory (120, 220) of the key.

Figure 3:
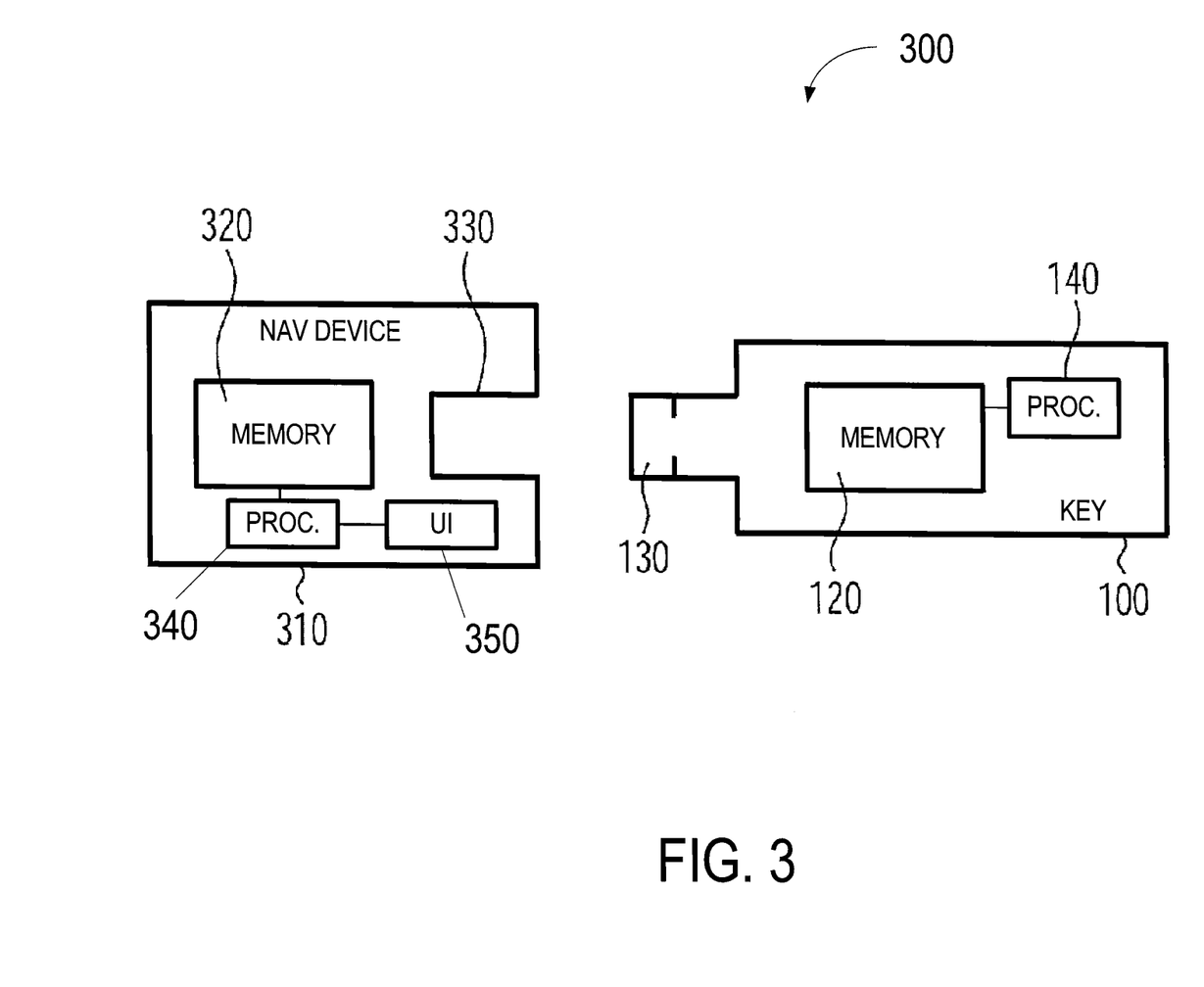
FIG. 3 illustrates an example of a navigation update system, including a navigation device and a key of a vehicle.

FIG. 3 is another example of a navigation update system 300 including a key and navigation system 310. In this example, the key is an electronic key 100 with a plug that serves as interface 130 permitting access to data stored in the memory 120 of the electronic key 100. The navigation device 310 includes an interface 330 and memory 320 and may be power by the vehicle in which it is included. The memory 320 of the navigation device 310 may be a memory storage device configured so as to keep its content even when the navigation device is disconnected from electrical power. For example, the memory 320 may be a flash memory. The memory 320 may contain instructions for execution to provide the functionality of the navigation device 310 and/or map data used by the navigation device 310.

The navigation device 310 may also include a processor 340 and a user interface 350. In other examples, the user interface 350 may be omitted. The processor 340 may be one or more computers capable of executing instructions to provide navigation services to a user, as well as provide an interface used in forming and maintaining a communication path to the key 100.

In FIG. 3, the processor 340 is coupled with the memory 320 and the user interface 350. The navigation system 310 may also include any other functionality found in a navigation system, such as a touch screen, a disc drive, configuration capabilities, communication links to external data sources, such as real-time or regularly updated traffic congestion data or traffic construction data.

The memory 120 of the electronic key 100 may store data such as instructions and map data together with a version descriptor of the instructions and the map data. The instructions and/or map data may be compressed or encrypted. In addition, the memory 120 may store instructions to provide the capability of the navigation system, instructions for the navigation device to provide the capability of the navigation update system, user preferences, a user address book, external device settings, or any other information related to operation of the navigation device 310. In addition, or alternatively, such information may be stored in the memory 320 of the navigation device 310.

Figure 4:
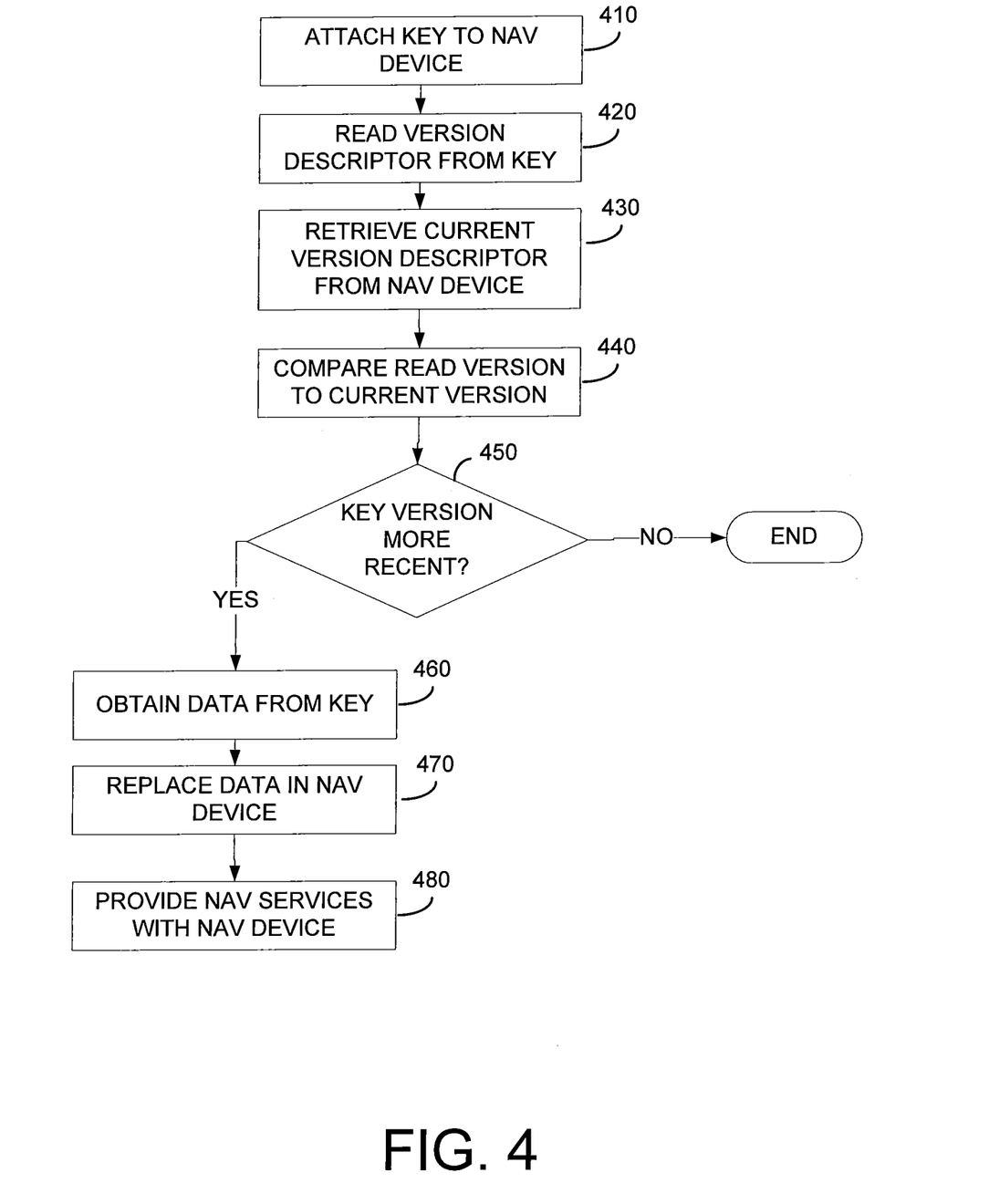
FIG. 4 illustrates operation of the exemplary system of FIG. 3.

Operation of the navigation update system 300 of FIG. 3 may be as described as depicted in the example of FIG. 4. In step 410, the interface 130 of the electronic key 100, such as a plug of the key 100 or a wireless interface of the key 100, is coupled to the interface 330 of the navigation device 310. After coupling the interface 130 of the key to the interface 330 of the navigation device, the vehicle may be put into operation. Before or after the vehicle is put into operation, the navigation device 310 accesses data, such as map data stored in the memory 120 of the key via the interface 330 of the navigation device, and the interface 130 of the key, such as the interface 130 integrated into the plug.

Then, in step 420, the navigation device 310 reads the version descriptor of the map data stored in the memory 120 of the key 100. Furthermore, the navigation device 310 obtains a current version descriptor associated with data, such as the map data, which is currently stored in the memory 320 of the navigation device 310 at step 430. In step 440, the navigation device compares the current version descriptor obtain from the memory 320 of the navigation device 310 with the version descriptor obtained from the memory 120 of the key 100 that is associated with the data, such as the map data stored in the key. In step 450, it is determined if the version descriptor obtained from the memory 120 of the key 100 indicates a more recent version than the current version descriptor obtained from the memory 320 of the navigation device, for example, by indicating a higher version number. If not, the operation ends. If the version descriptor obtained from the memory 120 of the key 100 indicates a more recent version than the current version descriptor obtained from the memory 320 of the navigation device, the navigation device 310 continues operation at step 460.

In step 460, the navigation device 310 copies the data, such as map data from the memory 120 of the key 100 to the memory 320 in the navigation device 310. In the process of copying, the data obtained from the memory 120 of the key 100 may be decompressed, if the data has been stored in a compressed format in the memory 120 of the key 100. Decompressing of the data may be executed by the navigation device, or by the processor 140 in the key. The obtained data, such as the map data, may be stored in the memory 320 of the navigation device 310. The obtained data may replace the data stored in the memory 320 of the navigation device 310.

After the new data, such as map data, has been decompressed and stored in the memory 320 of the navigation device 310, then, in step 470, the currently stored corresponding data, such as corresponding map data may be deleted, and the current version descriptor previously stored in the navigation device 310 may be replaced by the version descriptor obtained from the memory 120 of the key 100.

Finally, in step 480, the navigation device 310 may provide navigation services based on the data, such as map data, obtained from the key 100.

Figure 5:
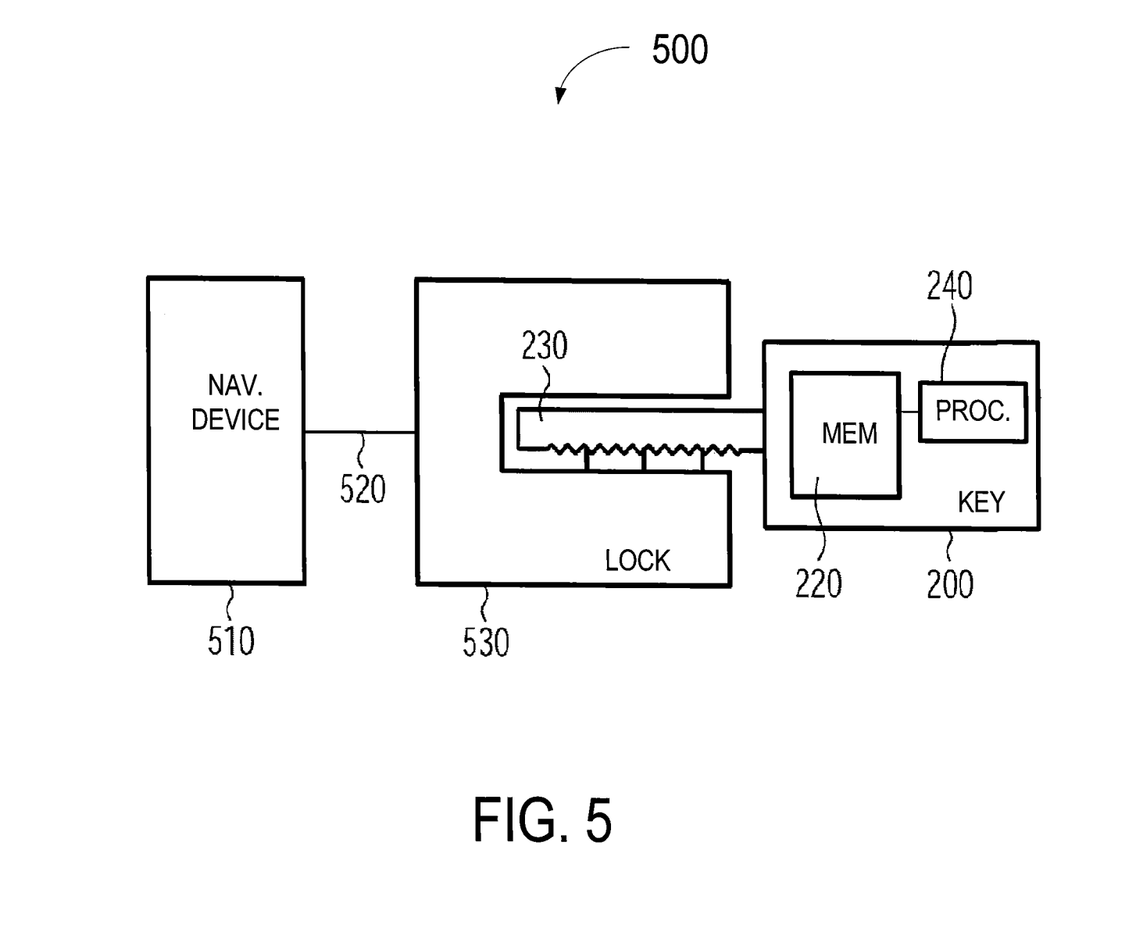
FIG. 5 illustrates another example of a navigation update system, including a key of a vehicle, a lock, and a navigation device.

Another example of a navigation update system 500 that includes a key is illustrated in FIG. 5. This system 500 includes a navigation device 510 and a mechanical key 200 with a bit 230. The bit 230 may be made of conductive material to form a communication path. In addition, a lock 530 of a vehicle is illustrated in FIG. 5. This lock 530 may be a lock for putting the vehicle into operation, unlocking an access door or panel, or any other lock on the vehicle. A wired data connection 520 may exist between the lock 530 and the navigation device 510 and form a part of the communication path. The memory 220 of the mechanical key 200 may include instructions as well as map data which may be used by the navigation system 510 to provide navigation services. The memory 220 of the key 200 may also store an encrypted hash value based on the instructions and map data stored in the memory 220 of the mechanical key 200. In addition, a first key version descriptor corresponding to instructions stored in the memory 220 of the key 200, and a second key version descriptor corresponding to map data stored in the memory 220 of the key 200 may be stored in the memory 220 of the mechanical key 200. In other examples, the lock 530 and the mechanical key 200 may create a communication path therebetween using wireless communication and a password.

Figure 6:
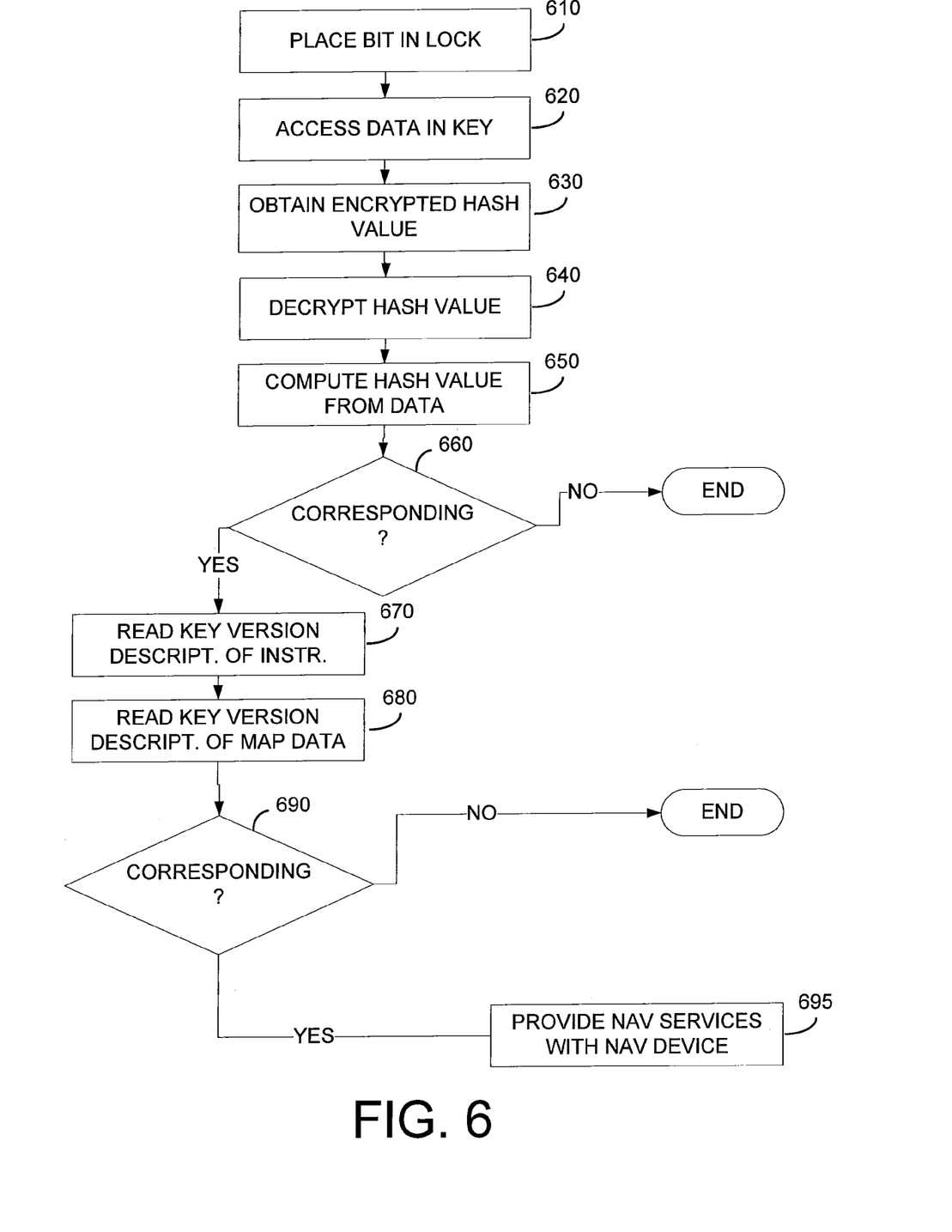
FIG. 6 illustrates operation of the exemplary system of FIG. 5.

Example operation of the navigation update system of FIG. 5 is illustrated by the operational flow diagram of FIG. 6. In step 610, the bit 230 of the key 200 is put into the lock 530. Then, the key 200 may actuate the lock 530 upon verification of a password of the key 200, such as by the key being turned in the lock 530. When verification of the key 200 and actuation of the lock 530 is completed, the vehicle may be put into operation by a user. Then, the navigation system 510 establishes access to the memory 220 in the mechanical key 200 in step 620, for example, by accessing the memory 220 via the connection 520 to the lock 530, which provides the electrical connection to the electrically conducting bit 230. The lock 530 provides an electrical connection to the bit 230 of the key 200 as soon as the key 200 has actuated the lock 530, such as by the key being turned in the lock 530. In step 630, the navigation system 510 obtains an encrypted password such as an encrypted hash value from the memory 220 of the key 200. The hash value is encrypted with a cryptographic private key which is associated with the manufacturer of the vehicle to which the mechanical key 200 may also be associated.

Then, in step 640, the navigation device 510 provides a cryptographic public key stored in the navigation device at an earlier time, and decrypts the encrypted password, such as the encrypted hash value using the cryptographic public key. In step 650, the navigation device 510 computes a hash value based on the instructions and the map data included in the memory 230 of the key 200. The computed hash value and the decrypted hash value are compared in step 660.

If both hash values are identical, then the navigation device 510 reads the first key version descriptor associated with the instructions stored in the memory of the mechanical key 200 and the second key version descriptor associated with the map data stored in the memory of the mechanical key 200 in step 670. To ensure that instructions and map data may be used together, both version descriptors are compared in step 690. If both version descriptors correspond to each other, for example, if they are identical, then the navigation device 510 starts providing navigation services in step 695 based on the instructions and map data stored in the mechanical key 200. For providing the navigation services, the navigation device 510 executes instructions stored in the memory 220 of the mechanical key 200, and accesses map data stored in the memory 220 of the mechanical key 200.

Figure 7:
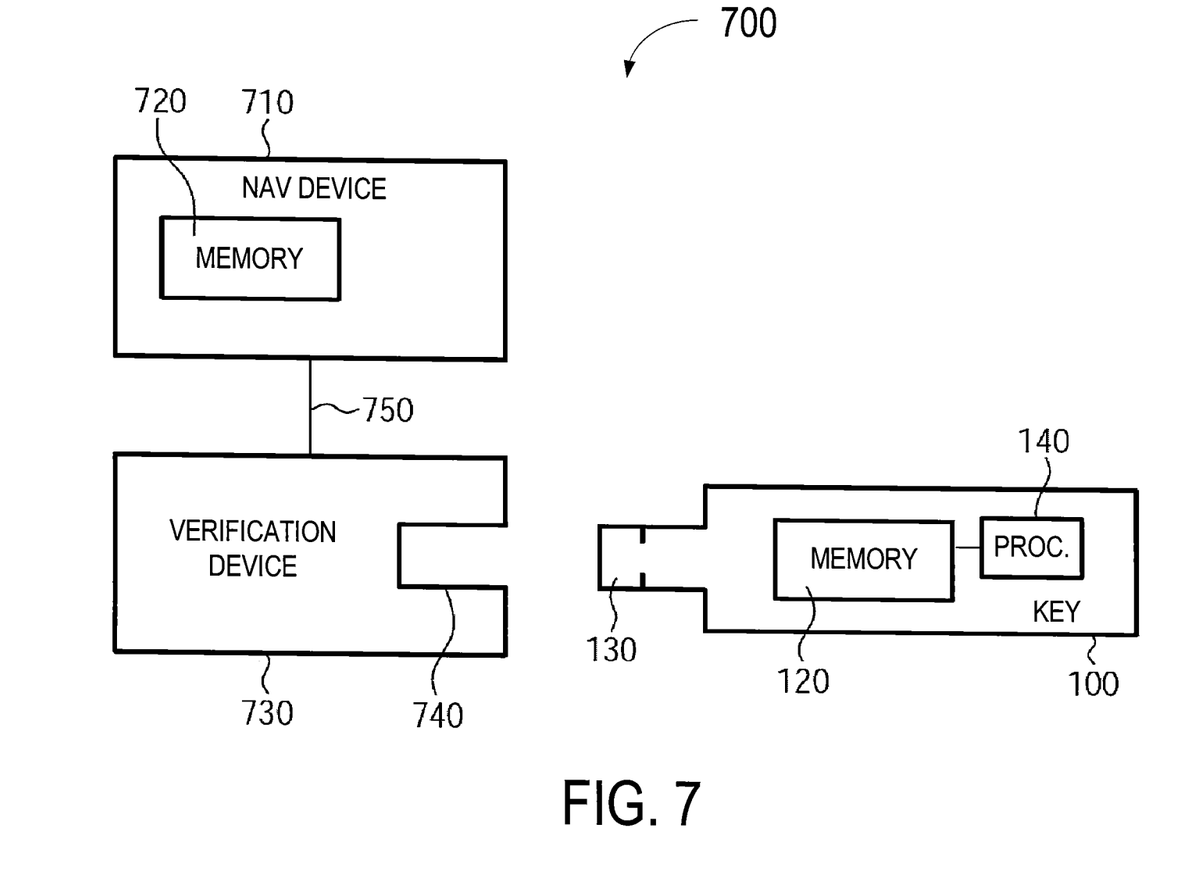
FIG. 7 illustrates a further example of a navigation update system, including a key of a vehicle, a verification device and a navigation device.

FIG. 7 illustrates yet another example of a navigation update system 700 that includes a key. The system 700 includes an electronic key 100 with a plug, comprising an interface 130 to its memory 120, as previously described. In other examples, the plug may be omitted and the interface 130 may be a wireless communication interface.

In FIG. 7, instructions permitting the navigation device 710 to provide navigation services may be stored in the memory 120 of the key 100, together with a version descriptor of the instructions. The instructions may be encrypted with a key such as a cryptographic symmetric key, and the encrypted instructions may be compressed. The cryptographic symmetric key itself may be encrypted with a private cryptographic key, which may be associated with a manufacturer of the vehicle to which the key may also be associated. The encrypted cryptographic symmetric key may be stored in the memory 120 of the key 100 as well.

Further, the navigation update system 700 may include a verification device 730 with an interface 740, to which the interface 130 of the electronic key 100 is attached to form a communication path. The verification device 730 may be electrically connected to the navigation device 710 via connection 750. In other examples, interface 740 of the verification device 730 and the interface 130 of the key 100 may create a communication path via wireless communication, and the connection 750 may be omitted and replaced with a wireless communication path between the verification device 730 and the navigation device 710. In still other examples, the connection 750 may be a communication bus, such as a vehicle communication bus, or any other mechanism providing a communication path. A memory 720 included in the navigation device 710 is configured to keep its content even if the navigation device 710 is disconnected from electrical power supplied by the vehicle. The memory 720 may be a flash memory or any other form of memory storage device. The navigation device 710 may include all the previously discussed operational functionality, including a processor and other hardware and software structure.

Figure 8:
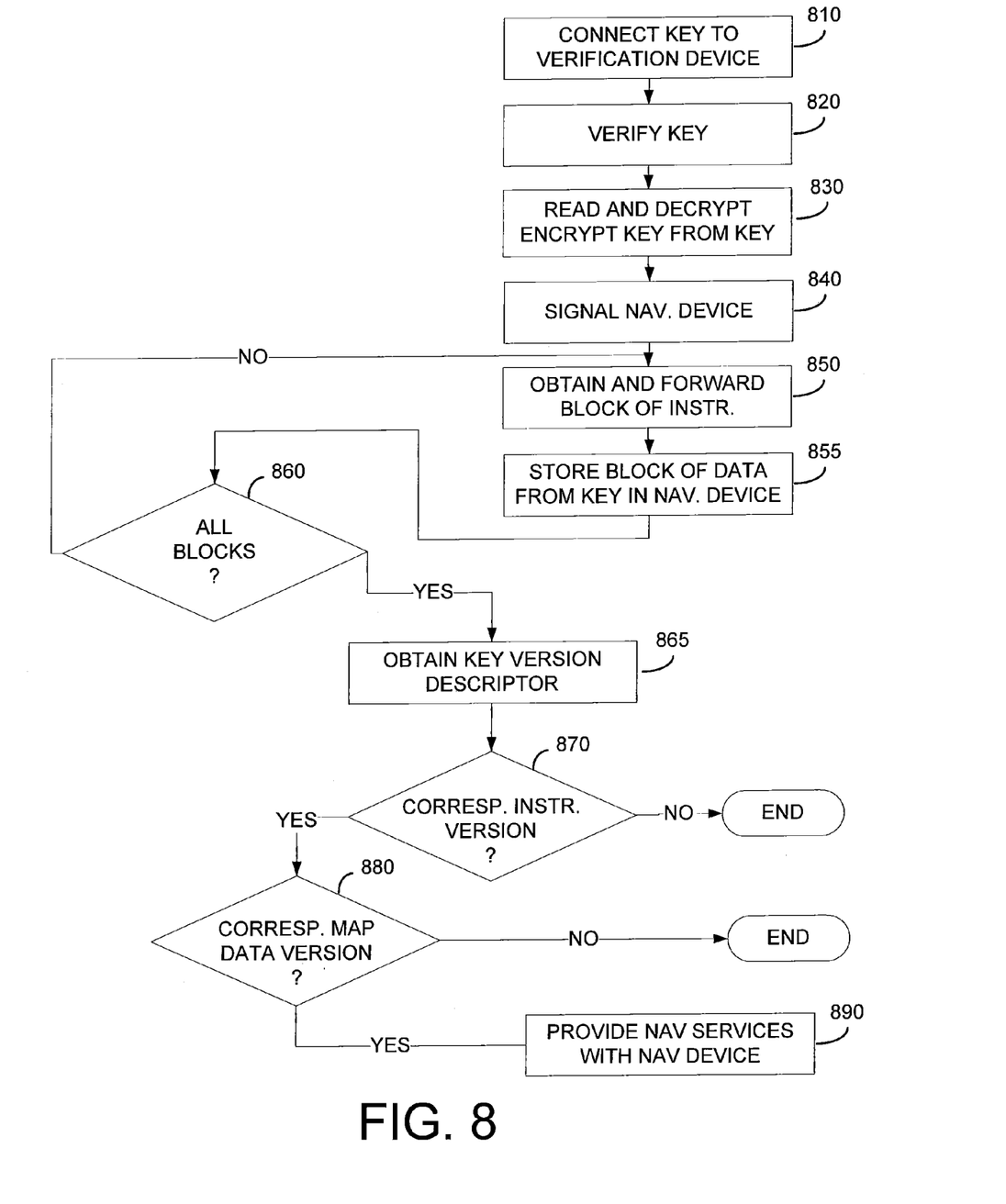
FIG. 8 illustrates operation of the exemplary system of FIG. 7.

FIG. 8 is an example operational flow diagram of the navigation update system of FIG. 7. In step 810, the interface 130 of the electronic key 100 is connected to the interface 740 of the verification device 730 to form a communication path. In step 820, the verification device 730 verifies the identity of the key 100, such as by using a password. Then, the verification device 730 establishes a connection to the memory 120 of the key via its interface 740, such as where the interface 130 of the key 100 is attached, or using wireless communication. Then, at step 830, the verification device 730 reads an encrypted key, such as an encrypted cryptographic symmetric key from the memory 120 of the key 100. By using a cryptographic public key, which corresponds to the manufacturer of the vehicle and is stored in the verification device 730, the verification device 730 decrypts the cryptographic symmetric key. Next, at step 840, the verification device 730 signals to the navigation device 710 via the connection 750 that new instructions (i.e. a new program code) for providing navigation services will be transmitted over the communication path.

In step 850, the verification device 730 obtains a block of instructions comprising at least one instruction from the memory 120 of the key 100, decompresses the block and decrypts the decompressed block using the cryptographic symmetric key. Then, the block of decompressed and decrypted instructions are forwarded to the navigation device 710. In step 855, the navigation device 710 accepts the block of instructions and stores the received instructions in its memory 720. In other examples, a stream or any other chunk of instructions may be communicated. At step 860, it is determined if all blocks of desired instructions in the memory 120 of the key have been processed. If not, steps 850 and 855 are continued until all the desired instructions in the memory 120 of the key 100 have been processed.

If all blocks of instructions in the memory 120 of the key 100 have been processed, the verification device 730 obtains a key version descriptor associated with the stored instructions from the memory 120 of the key 100 and forwards it to the navigation device 710 in step 865. In step 870, the navigation device 710 compares the key version descriptor received from the verification device 730 and checks if it corresponds to a more recent version than the current version descriptor associated with the instructions currently stored in the memory 720 of the navigation device 710. For example, the key version descriptor may include a higher number and the operation ends. The current version descriptor has been previously stored in the memory 720 of the navigation device 710.

In the case where the version descriptors are determined to be corresponding at step 870, in step 880, the navigation device 710 compares the key version descriptor received from the verification device 730, which is associated with the instructions stored in the key, with a version descriptor associated with the map data currently stored in the memory 720 of the navigation device 710. The navigation device 710 checks if the key version descriptor of the key 100 received from the verification device 730 corresponds to the version descriptor of the map data currently stored in the memory 720 of the navigation device 710. For example, the key version descriptor of the key 100 may indicate a version range which includes a number included in the version descriptor of the currently stored map data. If the version descriptors do not correspond, the operations end.

If both checks are successful, i.e. if the key version descriptor received from the verification device 730 corresponds to a more recent version than the version descriptor of the currently stored instructions included in the memory 720 of the navigation device 710, and if the key version descriptor of the key 100 corresponds to the version descriptor of the map data stored in the memory 720 of the navigation device 710, then the navigation device 710 replaces the currently stored instructions in its memory 720 by the received instructions in step 890. The version descriptor of the most recently used instructions is replaced by the version descriptor received from the verification device 730. From then on, the navigation device 710 may provide navigation services based on the received instructions.

Figure 9:
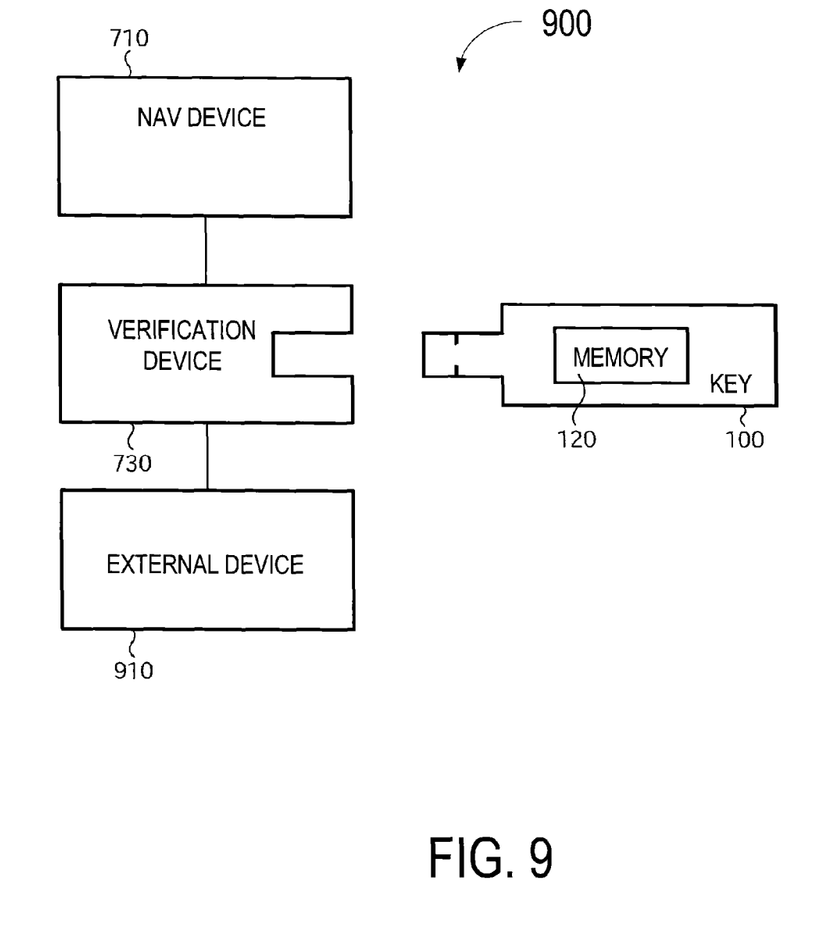
FIG. 9 illustrates another example of a navigation update system, including a key of a vehicle, a verification device, a navigation device, and an external device.

FIG. 9 is still another example of a navigation update system 900. The navigation system 900 includes a key 100, a navigation device 710, a verification device 730, and at least one additional external device 910. The additional external device 910 may be a device in a vehicle for controlling seat position or mirror orientation, or a radio, or a device for network access, a multimedia device, or any other functionality included in the vehicle. The verification device 730 may recognize the intended receiver of at least a part of the data stored in the memory 120 of the key 100. The verification device 730 may forward data obtained from the memory 120 of the key 100 to the intended receiver of that data. The intended receiver of that data may be the navigation device 710, or the external device 910, or another external device. There may be more than one external device 910 included in the vehicle and in communication with the verification device 730.

It is to be understood that the different parts and components of the navigation update system as described above can also be implemented independently of each other and be combined in different form. Furthermore, the above described examples of the navigation update system are to be construed as exemplary of other variations or designs that are possible.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A navigation update system for a vehicle comprising:
a key;
a memory storage device included in the key; and
an interface included in the key, where, the memory storage device is configured to store data for a navigation device of the vehicle via the interface, the data comprising at least one of instructions for execution by the navigation device or map data for use by the navigation device, where, the interface is configured to transfer the data between the memory storage device and the navigation device, in response to a first version descriptor associated with the key being conformant with a second version descriptor associated with the navigation device, and where, the first version descriptor is associated with the instructions stored in the memory storage device, and the navigation device is further configured to execute the instructions to use the map data stored in the memory storage device, in response to confirmation that the first version descriptor is compliant with a third version descriptor associated with the map data.

2. The navigation update system of claim 1, where at least a part of the data is encrypted.

3. The navigation update system of claim 1, where the interface is configured to provide access to the data stored in the memory storage device via a wired data connection or a wireless data connection.

4. The navigation update system of claim 1, where the key comprises a key bit comprising electrically conducting material, the key bit being the interface.

5. The navigation update system of claim 4, where the key is configured to start the vehicle in response to verification of the key based on at least one of form of the key bit or a password associated with the key.

6. The navigation update system of claim 5, where the verification is performed by insertion of the key in a verification interface of the vehicle, the vehicle interface configured to further transfer the data between the memory storage device and the navigation device.

7. The navigation update system of claim 5, where the key further comprises an electronic verification feature, the electronic verification feature comprising a hash value computed by a processor based on the data stored in the memory storage device.

8. A navigation update system for a vehicle comprising:
a navigation device configured to provide navigation service to an operator of the vehicle; and
a key of the vehicle, the key comprising a memory storage device having data stored therein;
the navigation device further configured to use the data stored in the memory storage device of the key of the vehicle, the data comprising at least one of instructions for execution by the navigation device or map data for use by the navigation device, where the key further comprises an interface and a processor, the processor configured to communicate with the memory storage device and the interface, and the processor further configured to provide access to the data stored in the memory storage device of the key via the interface; and
the navigation device further configured to access the data stored in the memory storage device of the key in response to confirmation by the navigation device that a first version descriptor associated with the key and a second version descriptor associated with the navigation device are compliant,
where, the first version descriptor is associated with the instructions stored in the memory storage device, and the navigation device is further configured to execute the instructions to use the map data stored in the memory storage device, in response to confirmation that the first version descriptor is compliant with a third version descriptor associated with the map data.

9. The navigation update system of claim 8, where the first version descriptor indicates a first version later than a second version indicated by the second version descriptor.

10. The navigation update system of claim 8, where the navigation device is further configured to obtain the data from the memory storage device of the key via the interface, and to copy the data obtained from the key to a memory storage device included in the navigation device.

11. The navigation update system of claim 8, where the navigation device is further configured to at least one of execute instructions stored in the memory storage device of the key, or access the map data stored in the memory storage device of the key to provide the navigation service.

12. The navigation update system of claim 8, where the processor is further configured to enable access to the data stored in the memory storage device of the key via a wired data connection or a wireless data connection.

13. The navigation update system of claim 8, where the interface is a bit of the key further configured to serve as a verification feature to put the navigation device in operation.

14. The navigation update system of claim 8, further comprising a verification device configured to verify an identity of the key via at least one verification feature.

15. The navigation update system of claim 14, where the verification device is further configured to forward the data obtained from the memory storage device included in the key to the navigation device.

16. The navigation update system of claim 14, where a bit of the key is a first verification feature, and a hash value is a second verification feature, where the hash value is computed by the processor based on the data stored in the memory storage device, and the hash value is stored in the memory storage device.

17. The navigation update system of claim 8, where the navigation device is further configured to compress the data to be stored in the memory storage device and decompress the data obtained from the memory storage device.

18. A method of providing a navigation service to a user of a key of a vehicle comprising:
establishing a communication path between a navigation device and the key via a bit of the key;
determining, by the navigation device, that a first version descriptor of the key corresponds to a second version descriptor of the navigation device;
the navigation device obtaining data from a memory storage device included as part of the key via the bit, where the data comprises at least one of instructions for execution by the navigation device or map data for use by the navigation device, and the first version descriptor is associated with the instructions stored in the memory storage device;
determining that the first version descriptor is compliant with a third version descriptor associated with the map data;
in response, executing, by the navigation device, the instructions to use the map data; and
providing the navigation service with the navigation device based on the data obtained.

19. The method of claim 18, where the communication path is a wireless data communication path.

20. The method of claim 18, further comprising decrypting at least some of the data obtained from the memory storage device of the key, where the decryption is performed by the navigation device or the key.

21. The method of claim 18, further comprising using the map data obtained from the memory storage device of the key with the navigation device to provide the navigation service.

22. The method of claim 18, further comprising decompressing, by the navigation device or the key, the data obtained from the memory storage device.

23. The method of claim 18, further comprising verifying an identity of the key via the bit of the key.

24. A navigation update system for a vehicle comprising:
   a navigation means for providing navigation information, the navigation means configured for installation in the vehicle, the navigation means configured to be powered by the vehicle to provide a navigation service to an operator of the vehicle; and
   a securing means for securing use of the vehicle by authentication of the operator, the securing means comprising a memory storage device having data stored therein, a processor coupled with the memory storage device, an interface to access the memory storage device, and a verification feature to put the navigation means in operation, where a bit included on the securing means is configured to serve as the interface and the verification feature, the bit comprising electrically conducting material;
   the navigation means further configured to use the data stored in the memory storage device of the securing means of the vehicle in response to a first version descriptor associated with the navigation means being compliant with a second version descriptor associated with the securing means, the data comprising at least one of instructions for execution by the navigation means or map data for use by the navigation means,
   where, the second version descriptor is associated with the instructions stored in the memory storage device, and the navigation means is further configured to execute the instructions to use the map data stored in the memory storage device, in response to confirmation that the second version descriptor is compliant with a third version descriptor associated with the map data.

25. The navigation update system of claim 24, where at least a part of the data is compressed and the processor is configured to decompress the at least the part of the data.

26. The navigation update system of claim 24, where the interface is configured to provide access to the data stored in the memory storage device via a wired data connection or a wireless data connection.

* * * * *